(12) United States Patent
Mizutani et al.

(10) Patent No.: US 11,430,649 B2
(45) Date of Patent: Aug. 30, 2022

(54) ANALYTICAL DEVICE

(71) Applicant: SHIMADZU CORPORATION, Kyoto (JP)

(72) Inventors: Shiro Mizutani, Kyoto (JP); Tomoyuki Oshiro, Kyoto (JP); Yuta Miyazaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/058,179

(22) PCT Filed: May 28, 2018

(86) PCT No.: PCT/JP2018/020356
§ 371 (c)(1),
(2) Date: Nov. 24, 2020

(87) PCT Pub. No.: WO2019/229804
PCT Pub. Date: Dec. 5, 2019

(65) Prior Publication Data
US 2021/0217604 A1 Jul. 15, 2021

(51) Int. Cl.
*H01J 49/40* (2006.01)
*G01N 30/72* (2006.01)
*H01J 49/00* (2006.01)

(52) U.S. Cl.
CPC ........ *H01J 49/401* (2013.01); *G01N 30/7233* (2013.01); *H01J 49/0009* (2013.01)

(58) Field of Classification Search
CPC ........ H01J 49/009; H01J 49/40; H01J 49/401; H01J 49/403; H01J 49/405; H01J 49/408; G01N 30/7233
See application file for complete search history.

(56) References Cited

U.S. PATENT DOCUMENTS

| | | | |
|---|---|---|---|
| 6,469,295 B1 * | 10/2002 | Park | H01J 49/40 250/282 |
| 2017/0110311 A1 * | 4/2017 | Reilly | H01J 49/401 |
| 2018/0315589 A1 | 11/2018 | Oshiro | |
| 2019/0006168 A1 | 1/2019 | Mizutani | |

FOREIGN PATENT DOCUMENTS

| | | | | |
|---|---|---|---|---|
| GB | 2402262 A | * | 12/2004 | H01J 49/403 |
| WO | 2017/068729 A1 | | 4/2017 | |
| WO | 2017/122276 A1 | | 7/2017 | |

OTHER PUBLICATIONS

International search report for PCT/JP2018/020356 dated Aug. 21, 2018.
Written opinion for PCT/JP2018/020356 dated Aug. 21, 2018.

* cited by examiner

*Primary Examiner* — David E Smith
(74) *Attorney, Agent, or Firm* — Sughrue Mion, PLLC

(57) ABSTRACT

An analytical device includes: a first acceleration unit including a first acceleration electrode to which a pulse voltage for accelerating ions is applied; a flight tube; a second acceleration unit that is arranged between the first acceleration unit and the flight tube, and includes a second acceleration electrode to which a voltage for accelerating the ions is applied; an ion detector that detects the ions; and a capacitance adjustment unit that causes adjustment of a capacitance between at least one set of electrodes among a plurality of electrodes arranged in the first acceleration unit, the second acceleration unit, and a flight tube.

9 Claims, 9 Drawing Sheets

ANALYTICAL DEVICE

CROSS-REFERENCE TO RELATED APPLICATIONS

This application is a National Stage of International Application No. PCT/JP2018/020356 filed May 28, 2018.

TECHNICAL FIELD

The present invention relates to an analytical device.

BACKGROUND ART

In a time-of-flight mass spectrometry device (hereinafter, referred to as TOF-MS as appropriate), ions are accelerated by an electric field generated by a pulse voltage and a constant voltage, and m/z (mass-to-charge ratio) of each ion is measured based on flight time that elapses before accelerated ions are detected by a detector. If the pulse voltage or constant voltage changes unintentionally due to measurement conditions, measurement accuracy of the flight time will decrease. In order to perform accurate mass spectrometry, it is necessary to suppress the variation in flight time depending on the measurement conditions to about several ppm or less, so it is necessary to improve the variation due to various causes.

As a method of suppressing such variation, for example, in Patent Literature 1 (PTL 1), variation in flight time due to voltage drop of the pulse voltage or the like, which occurs when the period between applying the pulse voltages (hereinafter referred to as a pulse period) changes, is reduced by changing the voltage applied to each electrode constituting the TOF-MS.

CITATION LIST

Patent Literature

PTL 1: International publication No. 2017/068729

SUMMARY OF INVENTION

Technical Problem

Stray capacitance is generated between a plurality of electrodes to which a pulse voltage or a constant voltage is applied to accelerate ions. Due to this stray capacitance, there is a problem that the pulse voltage applied to the electrodes causes voltage fluctuations of other electrodes to which a constant voltage is applied. Although it is considered that this voltage fluctuation can be reduced by directly connecting the grounded capacitor and each electrode, even with this method, the voltage fluctuation cannot be completely eliminated.

Solution to Problem

According to the 1st aspect of the present invention, an analytical device comprises: a first acceleration unit including a first acceleration electrode to which a pulse voltage for accelerating ions is applied; a flight tube; a second acceleration unit that is arranged between the first acceleration unit and the flight tube, and includes a second acceleration electrode to which a voltage for accelerating the ions is applied; an ion detector that detects the ions; and a capacitance adjustment unit that causes adjustment of a capacitance between at least one set of electrodes among a plurality of electrodes arranged in the first acceleration unit, the second acceleration unit, and a flight tube.

According to the 2nd aspect of the present invention, in the analytical device according to the 1st aspect, it is preferred that the first acceleration electrode includes a first electrode and a second electrode that is arranged at a position closer to the second acceleration unit in comparison with the first electrode; and the capacitance adjustment unit causes adjustment of at least one capacitance among one between the first electrode and the second acceleration electrode and one between the first electrode and the flight tube electrode arranged in the flight tube.

According to the 3rd aspect of the present invention, in the analytical device according to the 2nd aspect, it is preferred that the capacitance adjustment unit generates a capacitance between the first electrode and the second acceleration electrode or the flight tube electrode based on stray capacitance between the second electrode and the second acceleration electrode or the flight tube electrode.

According to the 4th aspect of the present invention, in the analytical device according to the 2nd or 3rd aspect, it is preferred that the capacitance adjustment unit causes adjustment of a capacitance between the first electrode and the second acceleration electrode that is arranged in the second acceleration unit at the closest position from the first acceleration unit.

According to the 5th aspect of the present invention, in the analytical device according to any one of the 1st to 4th aspects, it is preferred that the capacitance adjustment unit causes adjustment of a capacitance between the second acceleration electrode and another second acceleration electrode or an electrode arranged in the flight tube.

Advantageous Effects of Invention

According to the present invention, capacitance between a plurality of electrodes to which a pulse voltage or a constant voltage is applied can be precisely adjusted.

DESCRIPTION OF EMBODIMENTS

Hereinafter, embodiments for carrying out the present invention will be described with reference to the drawings.

First Embodiment

Figure 1:
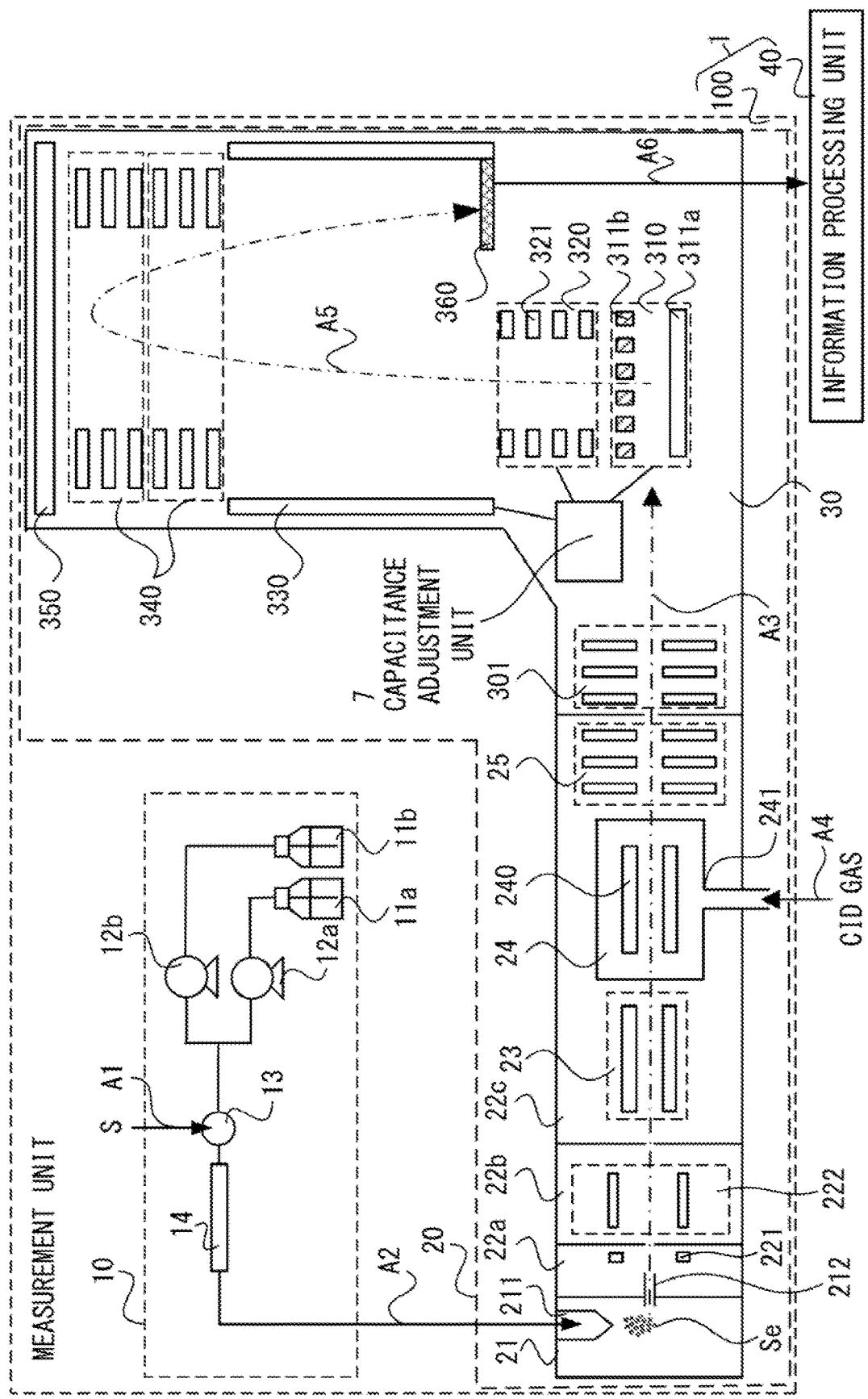
FIG. 1 is a conceptual diagram showing a configuration of an analytical device according to one embodiment.

FIG. 1 is a conceptual diagram for explaining an analytical device according to the present embodiment. The analytical device 1 includes a measurement unit 100 and an information processing unit 40. The measurement unit 100 includes a liquid chromatograph 10 and a mass spectrometer 20.

The liquid chromatograph 10 includes mobile phase containers 11a and 11b, liquid feeding pumps 12a and 12b, a sample introduction unit 13, and an analytical column 14. The mass spectrometer 20 includes an ionization chamber 21 having an ionization unit 211, a first vacuum chamber 22a having an ion lens 221, a tube 212 for introducing ions from the ionization chamber 21 into the first vacuum chamber 22a, a second vacuum chamber 22b having an ion guide 222, a third vacuum chamber 22c, and an analysis chamber 30. The third vacuum chamber 22c includes a first mass separation unit 23, a collision cell 24, and an ion guide 25. The collision cell 24 includes an ion guide 240 and a CID gas introduction port 241.

The analysis chamber 30 includes an ion transport electrode 301, a first acceleration unit 310, a second acceleration unit 320, a flight tube 330, a reflectron electrode 340, a back plate 350, and a detection unit 360. The first acceleration unit 310 includes a pusher electrode 311a and a puller electrode 311b. Hereinafter, the electrodes (the pusher electrode 311a and the puller electrode 311b) included in the first acceleration unit 310 will be referred to as first acceleration electrodes 311, and the electrodes included in the second acceleration unit 320 will be referred to as second acceleration electrodes 321.

The type of liquid chromatograph (LC) 10 is not particularly limited. Each of the mobile phase containers 11a and 11b includes container capable of storing liquid such as vial or bottle, and store mobile phases having different compositions respectively. The mobile phases stored in the mobile phase containers 11a and 11b are referred to as mobile phase A and mobile phase B, respectively. The mobile phase A and the mobile phase B having been output from the liquid feed pumps 12a and 12b, respectively, are mixed in the middle of the flow path and introduced into the sample introduction unit 13. The liquid feed pumps 12a and 12b change the composition of the mobile phase introduced into the analytical column 14 with time by changing the flow rates of the mobile phase A and the mobile phase B, respectively.

The sample introduction unit 13 includes a sample introduction device such as an autosampler, and introduces a sample S into the mobile phase (arrow A1). The sample S introduced by the sample introduction unit 13 passes through a guard column (not shown) as appropriate and is introduced into the analytical column 14.

The analytical column 14 has a stationary phase, and components of the introduced sample S are eluted at different retention times according to the difference in affinity of the component with the mobile phase and the stationary phase. The types of the analytical column 14 and the stationary phase are not particularly limited. The eluted sample eluted from the analytical column 14 is introduced into the ionization chamber 21 of the mass spectrometer 20 (arrow A2). It is preferable that the eluted sample of the analytical column 14 is input to the mass spectrometer 20 by online control without requiring an operation such as dispensing by a user of the analytical device 1 (hereinafter, simply referred to as "user").

The mass spectrometer 20 is an orthogonal acceleration type TOF-MS that performs tandem mass spectrometry on the eluted sample introduced from the analytical column 14. The path of an ionized eluted sample Se is schematically shown by the arrow A3 of long and short dashed line.

The ionization chamber 21 of the mass spectrometer 20 ionizes the introduced eluted sample Se. The ionization method is not particularly limited, but in the case where liquid chromatography/tandem mass spectrometry (LC/MS/MS) is performed as in the present embodiment, the electrospray method (ESI) is preferable, and thus the following description embodiments are explained on the assumption that ESI is performed. The ionized eluted sample Se emitted from the ionization unit 211 moves due to, for example, pressure difference between the ionization chamber 21 and the first vacuum chamber 22a, and passes through the tube 212, and enters the first vacuum chamber 22a.

A degree of vacuum is the highest in the analysis chamber 30, followed by that of the third vacuum chamber 22c, the second vacuum chamber 22b and the first vacuum chamber 22a in this order, and the analysis chamber 30 is evacuated to a pressure of, for example, $10^{-3}$ Pa or less. The ions that have entered the first vacuum chamber 22a pass through the ion lens 221 and are introduced into the second vacuum chamber 22b. The ions that have entered the second vacuum chamber 22b pass through the ion guide 222 and are introduced into the third vacuum chamber 22c. The ions introduced into the third vacuum chamber 22c are emitted to the first mass separation unit 23. By the time the ions enter the first mass separation unit 23, the ion lens 221, the ion guide 222, and the like converge the ions passing therethrough by electromagnetic action.

The first mass separation unit 23 includes a quadrupole mass filter, and has selectively pass through ions of set m/z as precursor ions by electromagnetic action based on voltage applied to the quadrupole mass filter and emit these ions toward the collision cell 24.

The collision cell 24 dissociates the ionized eluted sample Se by collision induced dissociation (CID) while controlling movement of the ions by the ion guide 240, to generate fragment ions. A gas containing argon, nitrogen, or the like that ions collide with during CID (hereinafter referred to as CID gas) is introduced from the CID gas introduction port 241 so as to have a predetermined pressure in the collision cell 24 (arrow A4). Ions containing the generated fragment ions are emitted toward the ion guide 25. The ions that have passed through the ion guide 25 enter the analysis chamber 30.

The ions that has entered the analysis chamber 30 pass through the ion transport electrode 301 while being controlled in movement by the ion transport electrode 301, and enter the first acceleration unit 310. The pusher electrode 311a of the first acceleration unit 310 is an acceleration electrode to which a pulse voltage having the same polarity as a polarity of ions to be detected is applied to accelerate the ions in a direction away from the pusher electrode 311a. The puller electrode 311b of the first acceleration unit 310 is formed in a grid pattern so that ions can pass through the inside thereof. The puller electrode 311b is an acceleration electrode to which a pulse voltage having a polarity opposite to a polarity of ions to be detected is applied to accelerate the ions located between the pusher electrode 311a and the puller electrode 311b toward the puller electrode 311b. The absolute value of the wave height of the pulse voltage applied to the pusher electrode 311a and the puller electrode 311b is several thousand V for example. When the pulse voltage is not applied to the pusher electrode 311a and the puller electrode 311b, a voltage of several tens of volts for example is appropriately applied. The ions accelerated by the electric field generated by the pulse voltage applied to the pusher electrode 311a and the puller electrode 311b in the first acceleration unit 310 enter the second acceleration unit 320. In FIG. 1, the path of the ions accelerated by the first acceleration unit 310 is schematically shown by an arrow A5.

A voltage of, for example, several thousand V having a polarity opposite to the polarity of ions to be detected is applied to the second acceleration electrode 321 of the second acceleration unit 320. The ions passing through the second acceleration unit 320 are appropriately converged while being accelerated by the electric field generated by the voltage applied to the second acceleration electrode 321 and enter the space surrounded by the flight tube 330.

The flight tube 330 includes a flight tube electrode, controls movement of ions by a voltage applied to the flight tube electrode, and defines a space in which ions fly. A voltage of, for example, several thousand V having a polarity opposite to that of the ions is applied also to the flight tube electrode.

A voltage higher than the flight tube voltage is applied to the reflectron electrode 340 and the back plate 350 at the time of detecting positive ions, and the electric field generated by this voltage changes the traveling direction of ions. The ions whose traveling directions have been changed move along the folded orbit schematically indicated by the arrow A5 and enter the detection unit 360. It is to be noted that, at the time of detecting negative ions, a voltage lower than the flight tube voltage is applied to the reflectron electrode 340 and the back plate 350.

The detection unit 360 includes an ion detector such as a multi-channel plate and detects ions that have entered the detection unit 360. A detection mode may be either a positive ion mode for detecting positive ions or a negative ion mode for detecting negative ions. A detection signal obtained by detecting the ions is A/D converted by an A/D converter (not shown), becomes a digital signal, and is input to the information processing unit 40 (arrow A6).

Capacitance Adjustment Unit 7

A capacitance adjustment unit 7 includes an element such as a capacitor that generates a capacitance between two connecting points. The capacitance adjustment unit 7 causes adjustment of the capacitance between at least one set of electrodes among the plurality of electrodes arranged in the first acceleration unit 310, the second acceleration unit 320, and the flight tube 330.

Figure 2:
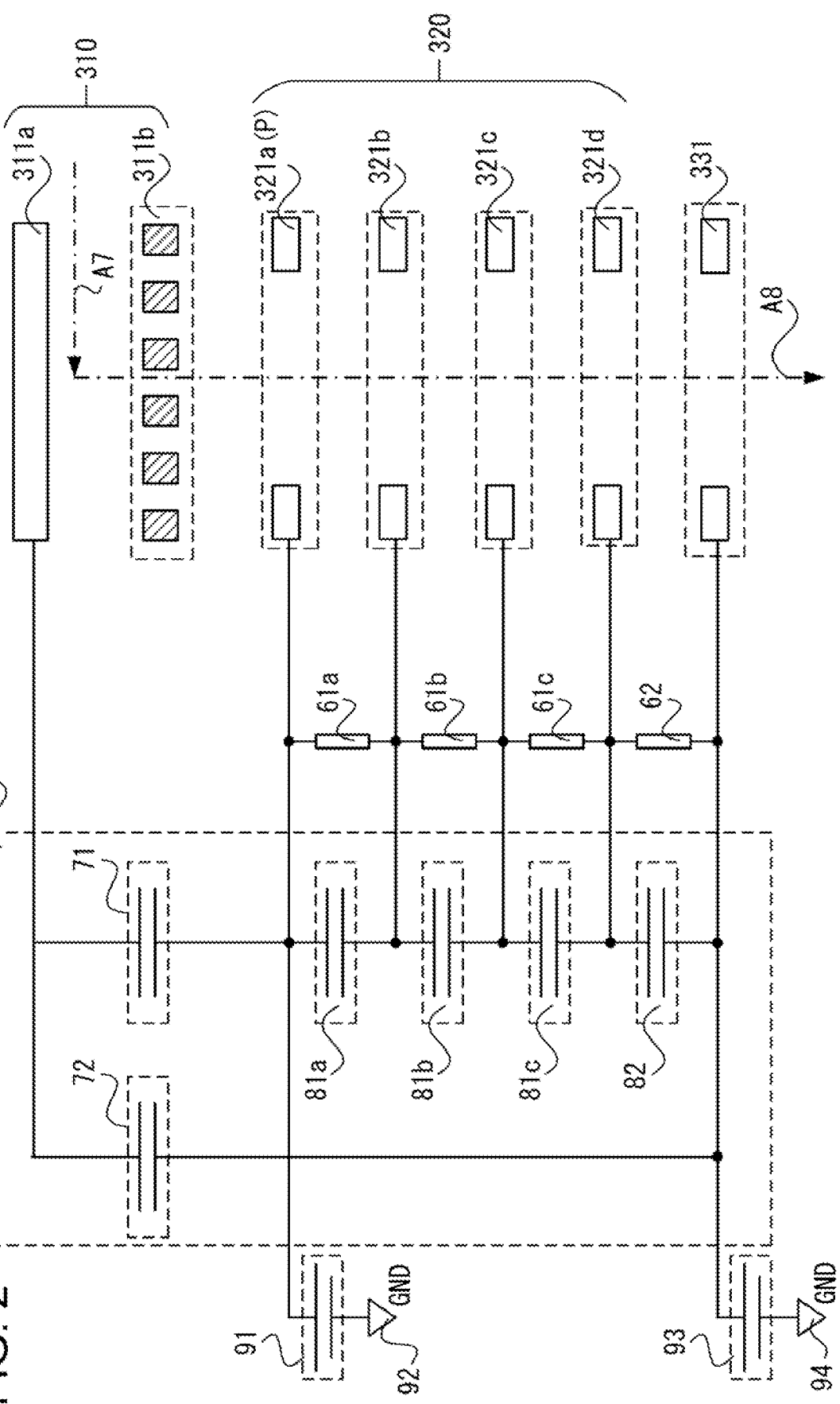
FIG. 2 is a conceptual diagram showing a configuration of a circuit including a capacitance adjustment unit.

FIG. 2 is a diagram schematically showing a configuration of a circuit including the capacitance adjustment unit 7. The analytical device 1 includes resistors 61a, 61b, 61c and 62, a second acceleration electrode power supply 91 connected to a GND 91, and a flight tube power supply 93 connected to a GND 94. In FIG. 2, contrary to FIG. 1, the pusher electrode 311a, the puller electrode 311b, the second acceleration electrodes 321a, 321b, 321c, 321d, and the flight tube electrode 331 are shown in this order from the top. Ions enter from the right side in the figure (arrow A7), are accelerated by the electric field generated by the voltage applied to the pusher electrode 311a and the like, and are emitted downward in the figure (arrow A8).

For example, when detecting positive ions, pulse voltages of +several thousand V and −several thousand V are applied to the pusher electrode 311a and the puller electrode 311b, respectively, and when the pulse voltage is not applied, the pulse voltage is several tens V or the like are applied to these. In FIG. 2, the circuit for applying these voltages to the pusher electrode 311a and the puller electrode 311b is not shown.

Among the electrodes included in the second acceleration unit 320, to the electrode located closest to the puller electrode 311b (hereinafter, appropriately referred to as the puller electrode side acceleration electrode P), a constant voltage is applied by the second acceleration electrode power supply 91. To the flight tube electrode 331, a constant voltage is applied by the flight tube power supply 93. Voltages of the puller electrode side acceleration electrode P and the flight tube electrode 331 are stabilized by feedback control that measures these voltages and adjusts these voltages based on the measurement result.

The resistor 61a connects between the puller electrode side acceleration electrode P and the second acceleration electrode 321b. The resistor 61b connects between the second acceleration electrode 321b and the second acceleration electrode 321c. The resistor 61c connects between the second acceleration electrode 321c and the second acceleration electrode 321d. The resistor 62 connects between the second acceleration electrode 321d the flight tube electrode 331. The resistors 61a, 61b, 61c and 62 set the voltages of the second accelerating electrodes 321b to 321d other than the puller electrode side acceleration electrode P in the second acceleration unit 320.

For example, in the case of detecting positive ions, the voltage of the puller electrode side acceleration electrode P is set to −3 kV, the voltage of the flight tube electrode 331 is set to −7 kV, and the voltages of the second acceleration electrodes 321b to 321d are respectively set to values between −3 kV and −7 kV. In the case of detecting negative ions, the voltages can be set as voltage values obtained by inverting the sign of the voltages for detecting a positive ion.

The capacitance adjustment unit 7 includes a first capacitor 71 arranged between the pusher electrode 311a and the puller electrode side acceleration electrode P, a second capacitor arranged between the pusher electrode 311a and the flight tube electrode 331, third capacitors 81a, 81b and 81c arranged respectively between adjacent two second acceleration electrodes, and a fourth capacitor 82 arranged between the second acceleration electrode 321d and the flight tube electrode 331. The capacitance adjustment unit 7 causes adjustment of capacitances between respective electrodes by these capacitors so as to stabilize the voltages of the second acceleration electrode 321 and the flight tube electrode 331 when the pulse voltage is applied. In the following, when it is recited that a capacitor is "arranged between A and B", it means that both ends of the capacitor are connected to A and B, respectively.

In the conventional analytical device, a pulse voltage applied to the first acceleration electrode 311 has caused voltage fluctuations in the electrodes included in the second acceleration unit 320 and the flight tube electrode 331.

Figure 3A:
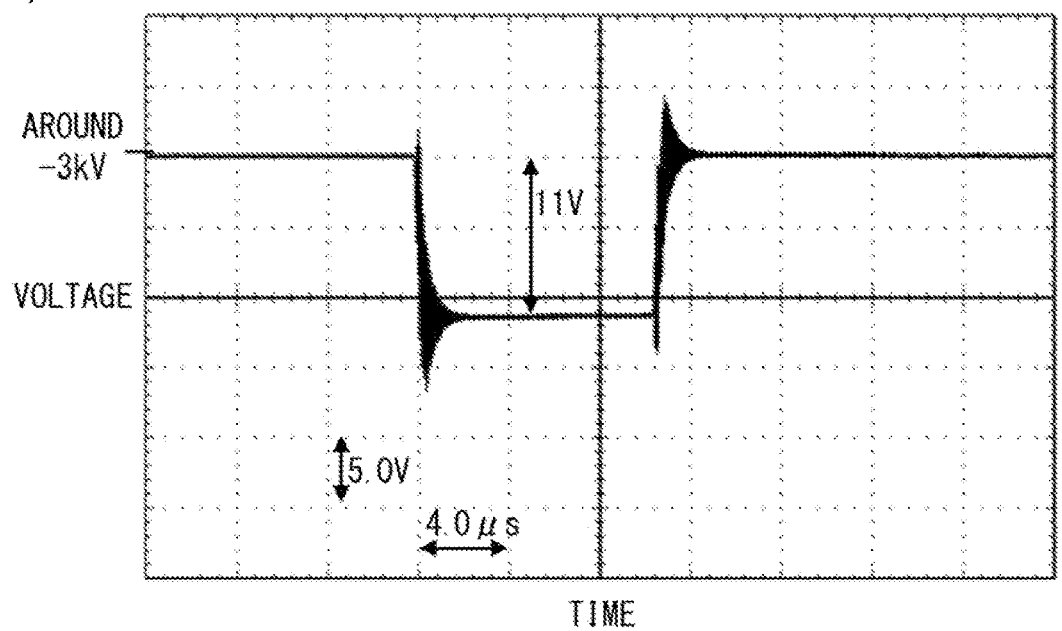
FIG. 3(A) is a graph showing voltage of a second acceleration electrode when capacitance is not adjusted by the capacitance adjustment unit.

FIG. 3(A) is a graph showing voltage fluctuations of the puller electrode side acceleration electrode when a negative pulse voltage is applied to the puller electrode in a conventional analytical device that does not have the capacitance adjustment unit 7. Here, around −3 kV is applied as a constant voltage to the puller electrode side acceleration electrode. Due to stray capacitance between the puller electrode and the puller electrode side acceleration electrode, a pulse-like noise of 11 V is observed when a pulse voltage is applied to the puller electrode.

A voltage of the puller electrode side acceleration electrode is stabilized by feedback control that measures the voltage and adjusts the voltage based on the measured voltage. Here, when the pulse period changes, the amount of voltage adjustment by feedback control changes, and therefore the voltage of the puller electrode side acceleration electrode changes. In the following, a case where the voltage is adjusted based on the average value by arithmetic mean of the voltage for a predetermined time longer than the pulse period in the feedback control will be described as an example.

For example, in the case where the pulse period is 500 μs (pulse frequency 2 kHz) and the pulse width is 10 μs, if there is a pulse-like noise of 11 V as described above, the voltage Vo of the puller electrode side acceleration electrode when the pulse voltage is not applied to the puller electrode is expressed by the following equation (1).

$$Vo=-(3\ kV-(10\ \mu s/500\ \mu s)\times 11\ V)=-2999.78\ V \quad (1)$$

On the other hand, the voltage V1 of the puller electrode side acceleration electrode when the pulse voltage is applied to the puller electrode is expressed by the following equation (2).

$$V1=-2999.78\ V-11\ V=-3010.78\ V \quad (2)$$

In the case where the pulse period is changed to 125 μs (pulse frequency 8 kHz) and the pulse width is 10 μs, if there is a pulse-like noise of 11 V as described above, the voltage Vo of the puller electrode side acceleration electrode when the pulse voltage is not applied to the puller electrode is expressed by the following equation (3).

$$Vo=-(3\ kV-(10\ \mu s/125\ \mu s)\times 11\ V)=-2999.12\ V \quad (3)$$

On the other hand, the voltage V1 of the puller electrode side acceleration electrode when the pulse voltage is applied to the puller electrode is expressed by the following equation (4).

$$V1=-2999.12\ V-11\ V=-3010.12\ V \quad (4)$$

From equations (1) to (4), in the conventional analytical device, it can be seen that when the pulse period changes from 500 μs to 125 μs, the voltage of the puller electrode side acceleration electrode changes by 0.66 V. This is a value that cannot be ignored for performing precise mass measurement and the like.

Next, the case where the pulse width is changed without changing the pulse period is considered. In the case where the pulse period is 125 μs, and the pulse width is changed to 3 μs, if there is a pulse-like noise of 11 V as described above, the voltage Vo of the puller electrode side acceleration electrode when the pulse voltage is not applied to the puller electrode is expressed by the following equation (5).

$$Vo=-(3\ kV-(3\ \mu s/125\ \mu s)\times 11\ V)=-2999.736\ V \quad (5)$$

On the other hand, the voltage V1 of the puller electrode side acceleration electrode when the pulse voltage is applied to the puller electrode is expressed by the following equation (6).

$$V1=-2999.736\ V-11\ V=-3010.736\ V \quad (6)$$

From equations (3) to (6), in the conventional analytical device, it can be seen that when the pulse width changes from 10 μs to 3 μs, the voltage of the puller electrode side acceleration electrode changes by 0.616 V. This is a value that cannot be ignored for performing precise mass measurement and the like.

Figure 3B:
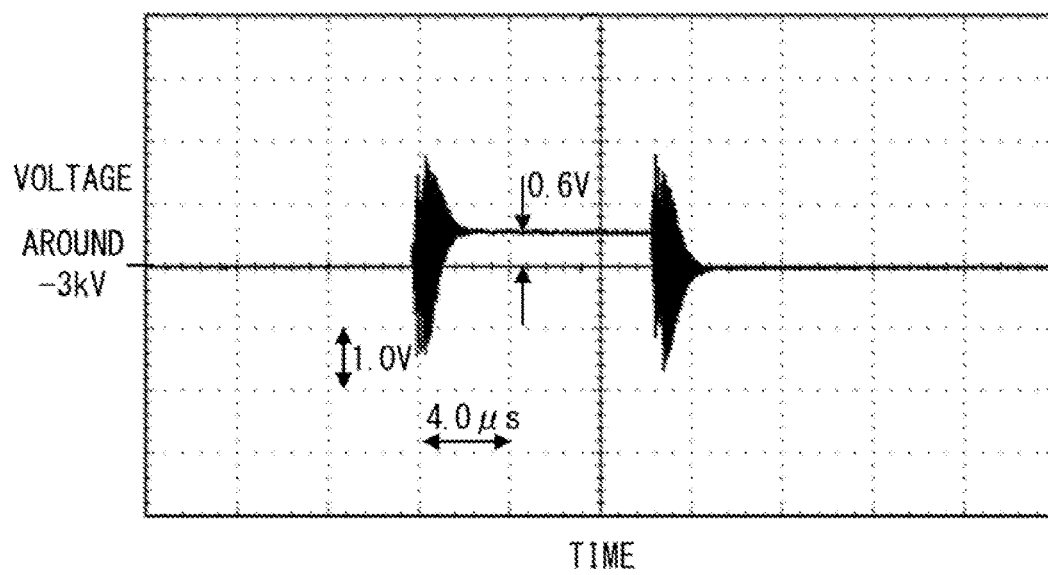
FIG. 3(B) is a graph showing voltage of the second acceleration electrode after capacitance has been adjusted by the capacitance adjustment unit.

FIG. 3(B) is a graph showing voltage fluctuations of the puller electrode side acceleration electrode when a negative pulse voltage is applied to the puller electrode in the case where a capacitor of 25 pF (corresponding to the first capacitor 71 in FIG. 2) is arranged between the pusher electrode and the puller electrode side acceleration electrode. Around −3 kV is applied as a constant voltage to the puller electrode side acceleration electrode. In the case shown in FIG. 3(B), a pulse-like noise of 0.6 V is observed by applying a pulse voltage to the puller electrode. This value is much smaller than 11 V in the case shown in FIG. 3(A).

For example, in the case where the pulse period is 500 μs and the pulse width is 10 μs, if there is a pulse-like noise of 0.6 V as described above, the voltage Vo of the puller electrode side acceleration electrode when the pulse voltage is not applied to the puller electrode is expressed by the following equation (7).

$$Vo=-(3\ kV-(10\ \mu s/500\ \mu s)\times 0.6\ V)=-2999.988\ V \quad (7)$$

On the other hand, the voltage V1 of the puller electrode side acceleration electrode when the pulse voltage is applied to the puller electrode is expressed by the following equation (8).

$$V1=-2999.988\ V-0.6\ V=-3000.588\ V \quad (8)$$

When the pulse period is changed to 125 μs and the pulse width is 10 μs, if there is a pulse-like noise of 0.6 V as described above, the voltage Vo of the puller electrode side acceleration electrode when the pulse voltage is not applied to the puller electrode is expressed by the following equation (9).

$$Vo=-(3\ kV-(10\ \mu s/125\ \mu s)\times 0.6\ V)=-2999.952\ V \quad (9)$$

On the other hand, the voltage V1 of the puller electrode side acceleration electrode when the pulse voltage is applied to the puller electrode is expressed by the following equation (10).

$$V1=-2999.952\ V-0.6\ V=-3000.552\ V \quad (10)$$

From equations (7) to (10), in the analytical device provided with the first capacitor 71, it can be seen that even when the pulse period changes from 500 μs to 125 μs, the voltage change of the puller electrode side acceleration electrode can be suppressed to 36 mV. This is a significantly smaller value than the voltage fluctuation of 0.66 V in the case where the first capacitor 71 is absent.

Next, the case where the pulse width is changed without changing the pulse period is considered. In the case where the pulse period is 125 μs and the pulse width is changed to 3 μs, if there is a pulse-like noise of 0.6 V as described above, the voltage Vo of the puller electrode side acceleration electrode when the pulse voltage is not applied to the puller electrode is expressed by the following equation (11).

$$Vo=-(3\ kV-(3\ \mu s/125\ \mu s)\times 0.6\ V)=-2999.9856\ V \quad (11)$$

On the other hand, the voltage V1 of the puller electrode side acceleration electrode when the pulse voltage is applied to the puller electrode is expressed by the following equation (12).

$$V1=-2999.9856\ V-0.6\ V=-3000.5856\ V \tag{12}$$

From equations (9) to (12), in the analytical device provided with the first capacitor 71, it can be seen that even when the pulse width changes from 10 µs to 3 µs, the voltage change of the puller electrode side acceleration electrode can be suppressed to 33.6 mV. This is a significantly smaller value than the voltage fluctuation of 0.616 V in the case where the first capacitor 71 is absent.

From the above, by providing the first capacitor 71, the analytical device 1 can reduce the change in the voltage of the puller electrode side acceleration electrode P due to the change in the pulse period. Thereby, for ions having various m/z, it is possible to set pulse period according to the flight time predicted from the value of m/z, and the ions can be efficiently detected and the flight time can be accurately measured.

It is to be noted that, by arranging a capacitor between the puller electrode side acceleration electrode P and GND, the voltage fluctuation of the puller electrode side acceleration electrode P due to the pulse voltage can be reduced, however, a capacitance of the capacitor arranged in this case becomes much larger than the capacitance of the first capacitor 71. Therefore, when reversing a polarity of the detected ions, it will take time, or it will be necessary to increase the output power of the second acceleration electrode power supply 91 or the like.

The capacitance of the first capacitor 71 can be appropriately set for each analytical device 1 so that the voltage fluctuation of the puller electrode side acceleration electrode P due to the pulse voltage applied to the puller electrode 311*b* becomes small. Preferably, the capacitance of the first capacitor 71 is set based on the stray capacitance between the puller electrode 311*b* and the puller electrode side acceleration electrode P. For example, it is assumed that pulse voltages having opposite polarities and the same magnitudes are to be applied respectively to the pusher electrode 311*a* and the puller electrode 311*b*. In this case, by the arrangement of the first capacitor 71, a capacitance equal to the stray capacitance between the puller electrode 311*b* and the puller electrode side acceleration electrode P is generated between the pusher electrode 311*a* and the puller electrode side acceleration electrode P. Thereby, the voltage fluctuation of the puller electrode side acceleration electrode P due to the pulse voltage applied to the puller electrode 311*b* is canceled by the voltage fluctuation of the puller electrode acceleration electrode 321 due to the pulse voltage applied to the pusher electrode 311*a*, and the voltage fluctuation of the puller electrode side acceleration electrode P is to be reduced.

Figure 4A:
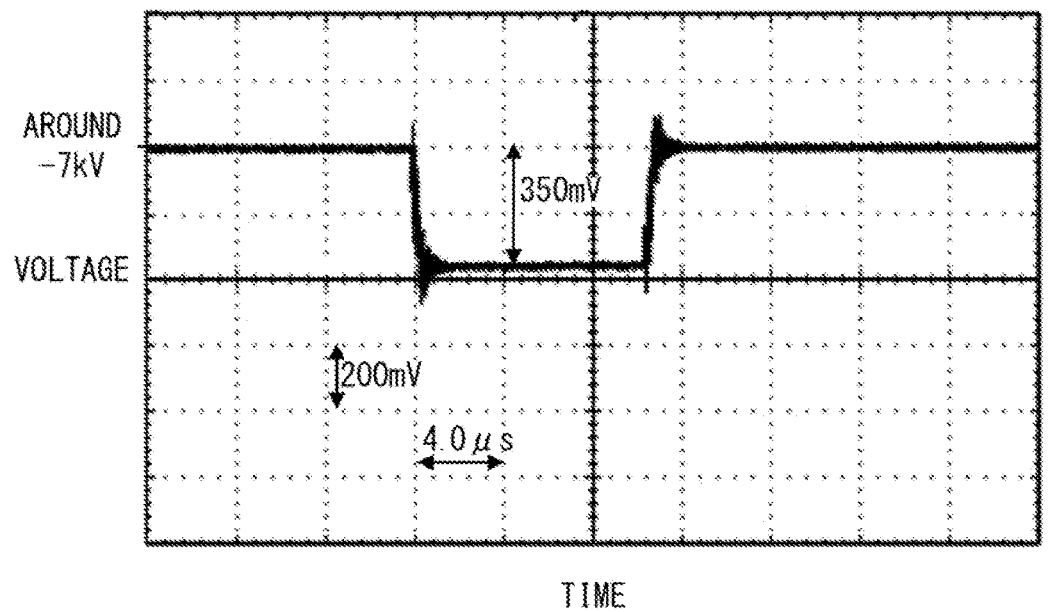
FIG. 4(A) is a graph showing voltage of a flight tube electrode when capacitance is not adjusted by the capacitance adjustment unit.

FIG. 4(A) is a graph showing voltage fluctuations of the flight tube electrode when a negative pulse voltage is applied to the puller electrode in a conventional analytical device that does not have the capacitance adjustment unit 7. Here, around −7 kV is applied as a constant voltage to the flight tube electrode. Due to the stray capacitance between the puller electrode and the flight tube electrode, a pulse-like noise of 350 mV is observed when a pulse voltage is applied to the puller electrode.

A voltage of the flight tube electrode is stabilized by feedback control that measures the voltage and adjusts the voltage based on the measured voltage. Here, when the pulse period changes, the amount of voltage adjustment by feedback control changes, and therefore the voltage of the flight tube electrode changes. In the following, a case where the voltage is adjusted based on the average value by arithmetic mean of the voltage for a predetermined time longer than the pulse period in the feedback control will be described as an example.

For example, in the case where the pulse period is 500 µs (pulse frequency 2 kHz) and the pulse width is 10 µs, if there is a pulse-like noise of 350 mV as described above, the voltage Vo of the flight tube electrode when the pulse voltage is not applied to the puller electrode is expressed by the following equation (101).

$$Vo=-(7\ kV-(10\ \mu s/500\ \mu s)\times 0.35\ V)=-6999.993\ V \tag{101}$$

On the other hand, the voltage V1 of the flight tube electrode when the pulse voltage is applied to the puller electrode is expressed by the following equation (102).

$$V1=-6999.993\ V-0.35\ V=-7000.343\ V \tag{102}$$

When the pulse period is changed to 125 µs (pulse frequency 8 kHz) and the pulse width is 10 µs, if there is a pulse-like noise of 350 mV as described above, the voltage Vo of the flight tube electrode when the pulse voltage is not applied to the puller electrode is expressed by the following equation (103).

$$Vo=-(7\ kV-(10\ \mu s/125\ \mu s)\times 0.35\ V)=-6999.972\ V \tag{103}$$

On the other hand, the voltage V1 of the puller electrode side acceleration electrode when the pulse voltage is applied to the puller electrode is expressed by the following equation (104).

$$V1=-6999.972\ V-0.35\ V=-7000.322\ V \tag{104}$$

From equations (101) to (104), in the conventional analytical device, it can be seen that when the pulse period changes from 500 µs to 125 µs, the voltage of the flight tube electrode changes by 21 mV. This is a value that cannot be ignored for performing precise mass measurement and the like.

Next, the case where the pulse width is changed without changing the pulse period is considered. In the case where the pulse period is 125 µs and the pulse width is changed to 3 µs, if there is a pulse-like noise of 0.35 V as described above, the voltage Vo of the flight tube electrode when the pulse voltage is not applied to the puller electrode is expressed by the following equation (105).

$$Vo=-(7\ kV-(3\ \mu s/125\ \mu s)\times 0.35\ V)=-6999.9916\ V \tag{105}$$

On the other hand, the voltage V1 of the puller electrode side acceleration electrode when the pulse voltage is applied to the puller electrode is expressed by the following equation (106).

$$V1=-6999.9916\ V-0.35\ V=-7000.3416\ V \tag{106}$$

From equations (103) to (106), in the conventional analytical device, it can be seen that when the pulse width changes from 10 µs to 3 µs, the voltage of the flight tube electrode changes by 19.6 mV. This is a value that cannot be ignored for performing precise mass measurement and the like.

Figure 4B:
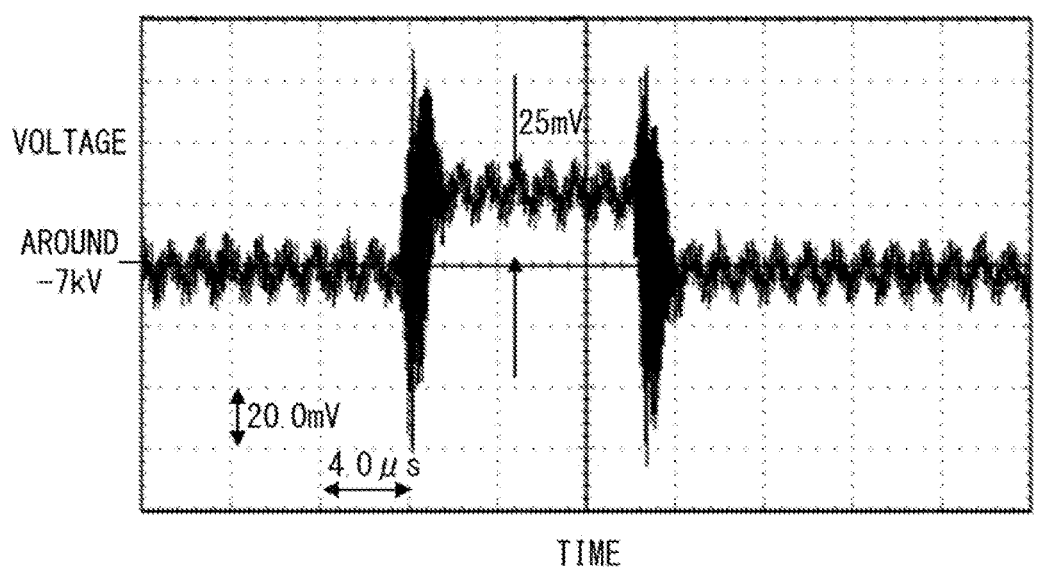
FIG. 4(B) is a graph showing voltage of the flight tube electrode after capacitance has been adjusted by the capacitance adjustment unit.

FIG. 4(B) is a graph showing voltage fluctuations of the flight tube electrode when a negative pulse voltage is applied to the puller electrode in the case where a capacitor of 0.5 pF (corresponding to the second capacitor 72 in FIG. 2) is arranged between the pusher electrode and the flight tube electrode. Around −7 kV is applied as a constant voltage to the flight tube electrode. In the case shown in FIG. 4(B), a pulse-like noise of 25 mV is observed by applying a pulse voltage to the puller electrode. This value is much smaller than 350 mV in the case shown in FIG. 4(A).

For example, in the case where the pulse period is 500 μs and the pulse width is 10 μs, if there is a pulse-like noise of 25 mV as described above, the voltage Vo of the flight tube electrode when the pulse voltage is not applied to the puller electrode is expressed by the following equation (107).

$$Vo=-(7 \text{ kV}-(10 \text{ μs}/500 \text{ μs}) \times 0.025 \text{ V})=-6999.9995 \text{ V} \quad (107)$$

On the other hand, the voltage V1 of the flight tube electrode when the pulse voltage is applied to the puller electrode is expressed by the following equation (108).

$$V1=-6999.9995 \text{ V}-0.025 \text{ V}=-7000.0245 \text{ V} \quad (108)$$

In the case where the pulse period is changed to 125 μs and the pulse width is 10 μs, if there is a pulse-like noise of 25 mV as described above, the voltage Vo of the flight tube electrode when the pulse voltage is not applied to the puller electrode is expressed by the following equation (109).

$$Vo=-(7 \text{ kV}-(10 \text{ μs}/125 \text{ μs}) \times 0.025 \text{ V})=-6999.998 \text{ V} \quad (109)$$

On the other hand, the voltage V1 of the flight tube electrode when the pulse voltage is applied to the puller electrode is expressed by the following equation (110).

$$V1=-6999.998 \text{ V}-0.025 \text{ V}=-7000.023 \text{ V} \quad (110)$$

From equations (107) to (110), in the analytical device provided with the second capacitor 72, it can be seen that even when the pulse period changes from 500 μs to 125 μs, the voltage change of the flight tube electrode can be suppressed to 1.5 mV. This is a significantly smaller value than the voltage fluctuation of 21 mV in the case where the second capacitor 72 is absent.

Next, the case where the pulse width is changed without changing the pulse period is considered. In the case where the pulse period is 125 μs and the pulse width is changed to 3 μs, if there is a pulse-like noise of 25 mV as described above, the voltage Vo of the flight tube electrode when the pulse voltage is not applied to the puller electrode is expressed by the following equation (111).

$$Vo=-(7 \text{ kV}-(3 \text{ μs}/125 \text{ μs}) \times 0.025 \text{ V})=-6999.9994 \text{ V} \quad (111)$$

On the other hand, the voltage V1 of the flight tube electrode when the pulse voltage is applied to the puller electrode is expressed by the following equation (112).

$$V1=-6999.9994 \text{ V}-0.025 \text{ V}=-7000.0244 \text{ V} \quad (112)$$

From equations (109) to (112), in the analytical device provided with the second capacitor 72, it can be seen that even when the pulse width changes from 10 μs to 3 μs, the voltage change of the flight tube electrode can be suppressed to 1.4 mV. This is a significantly smaller value than the voltage fluctuation of 19.6 mV in the case where the second capacitor 72 is absent.

From the above, by providing the second capacitor 72, the analytical device 1 can reduce the change in the voltage of the flight tube electrode 331 due to the change in the pulse period. Thereby, for ions having various m/z, it is possible to set pulse period according to the flight time predicted from the value of m/z, and the ions can be efficiently detected and the flight time can be accurately measured.

It is to be noted that, by arranging a capacitor between the flight tube electrode 331 and GND, the voltage fluctuation of the flight tube electrode 331 due to the pulse voltage can be reduced, however a capacitance of the capacitor arranged in this case becomes much larger than the capacitance of the second capacitor 72. Therefore, when reversing the polarity of the detected ions, it will take time, or it will be necessary to increase the output power of the flight tube power supply 93 or the like.

The capacitance of the second capacitor 72 can be appropriately set for each analytical device 1 so that the voltage fluctuation of the flight tube electrode 331 due to the pulse voltage applied to the puller electrode 311b becomes small. Preferably, the capacitance of the second capacitor 72 is set based on the stray capacitance between the puller electrode 311b and the flight tube electrode 331. For example, it is assumed that pulse voltages having opposite polarities and the same magnitudes are to be applied respectively to the pusher electrode 311a and the puller electrode 311b. In this case, by the arrangement of the second capacitor 72, a capacitance equal to the stray capacitance between the puller electrode 311b and the flight tube electrode 331 is generated between the pusher electrode 311a and the flight tube electrode 331. Thereby, the voltage fluctuation of the flight tube electrode 331 due to the pulse voltage applied to the puller electrode 311b is canceled by the voltage fluctuation of the flight tube electrode 331 due to the pulse voltage applied to the pusher electrode 311a, and the voltage fluctuation of the flight tube electrode 331 is reduced.

Due to a stray capacitance between the puller electrode and each second acceleration electrode other than the puller electrode side acceleration electrode, the voltage of the second acceleration electrode other than the puller electrode side acceleration electrode may change by pulse voltage of the puller electrode.

In the analytical device 1, the third capacitors 81a, 81b and 81c are arranged between the neighboring second acceleration electrodes 321. Further, in the analytical device 1, the fourth capacitor 82 is arranged between the second acceleration electrode 321d, which is arranged in the second acceleration unit 320 closest to the flight tube, and the flight tube electrode 331. The third capacitors 81a, 81b, 81c and the fourth capacitor 82 are arranged in parallel with the resistors 61a, 61b, 61c and 61d, respectively.

It should be noted that the number of the second acceleration electrodes 321 arranged in the second acceleration unit 320, the number of the third capacitors 81a, 81b and 81c, and the number of the resistors 61a, 61b and 61c are not particularly limited.

It is preferable that each capacitance of the third capacitors 81a, 81b and 81c, and the fourth capacitor 82 is larger than each stray capacitance between the puller electrode 311b and each of the second acceleration electrodes 321b to 321d, respectively. Thereby, the puller electrode side acceleration electrode P and the flight tube electrode 331 both having less voltage fluctuation are coupled with the second acceleration electrodes 321b to 321d via capacitors, so that the voltage fluctuation of the second acceleration electrodes 321b to 321d becomes small.

Figure 5:
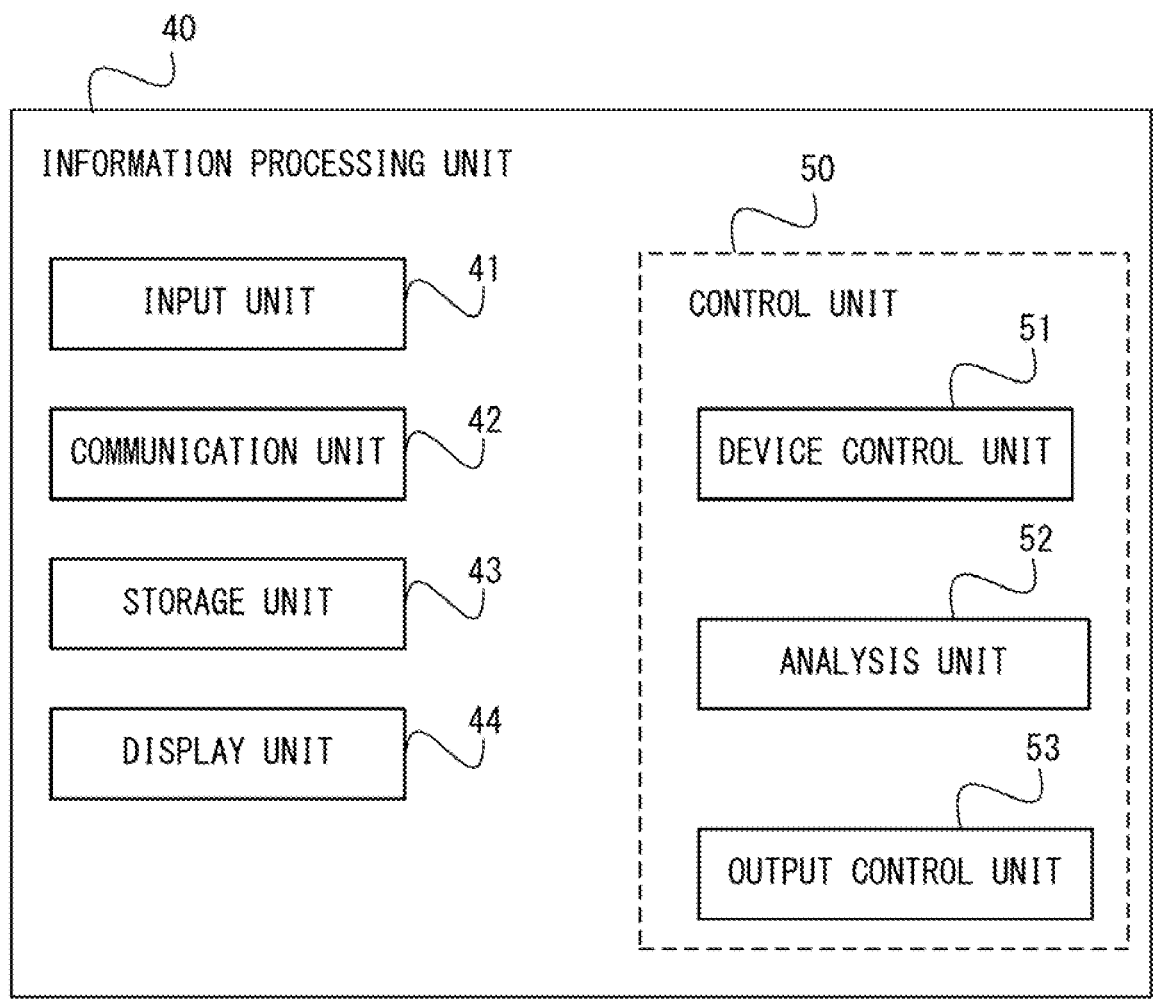
FIG. 5 is a conceptual diagram showing a configuration of an information processing unit.

FIG. 5 is a conceptual diagram showing a configuration of the information processing unit 40 of the analytical device 1. The information processing unit 40 includes an input unit 41, a communication unit 42, a storage unit 43, an output unit 44, and a control unit 50. The control unit 50 includes a device control unit 51, an analysis unit 52, and an output control unit 53.

The information processing unit 40 is provided with an information processing device such as a computer and serves as an interface with a user as appropriate, and also performs processing such as communication, storage, and calculation related to various data. The information processing unit 40 is a processing device that performs processing of controlling the measurement unit 100, analysis, and display.

It is to be noted that, the information processing unit 40 may be configured as one device integrated with the liquid chromatograph 10 and/or the mass spectrometer 20. Further, a part of the data used by the analytical device 1 may be stored in a remote server or the like, and a part of arithmetic processing performed by the analytical device 1 may be performed by a remote server or the like. The information processing unit 40 may control operation of each section of the measurement unit 100, or the devices constituting each section may control the operation.

The input unit 41 of the information processing unit 40 includes an input device such as a mouse, a keyboard, various buttons, and/or a touch panel. The input unit 41 receives from the user information necessary for the measurement performed by the measurement unit 100 and the processing performed by the control unit 50.

The communication unit 42 of the information processing unit 40 includes a communication device capable of communicating by a wireless or wired connection via a network such as the internet. The communication unit 42 appropriately transmits and receives necessary data, i.e. the communication unit receives data necessary for measurement by the measurement unit 100 and transmits data processed by the control unit 50 such as results of analysis by the analysis unit 52.

The storage unit 43 of the information processing unit 40 includes a non-volatile storage medium. The storage unit 43 stores measurement data based on the detection signal output from the detection unit 360, a program for the control unit 50 to execute processing, and the like.

The output unit 44 of the information processing unit 40 is controlled by the output control unit 53 and includes a display device such as a liquid crystal monitor and/or a printer. The output unit 44 outputs information on the measurement of the measurement unit 100, results of analysis by the analysis unit 52, and the like by displaying on a display device or printing on a print medium.

The control unit 50 of the information processing unit 40 includes a processor such as a CPU. The control unit 50 performs various processes by executing a program stored in the storage unit 43 or the like, such as controlling the measurement unit 100 or analyzing measurement data.

The device control unit 51 of the control unit 50 controls the measurement operation of the measurement unit 100 based on the measurement conditions and the like set according to the input or the like via the input unit 41. The device control unit 51 controls the voltages applied to the first acceleration electrode 311, the second acceleration electrode 321 and the flight tube electrode 331. For example, according to the polarity of ions to be detected, the device control unit 51 inverts voltages applied to the second acceleration electrode 321 and the flight tube electrode 331.

The analysis unit 52 analyzes the measurement data. The analysis unit 52 converts the flight time of the detection signal output from the detection unit 360 into m/z based on a calibration data acquired in advance, and makes the m/z values of detected ions correspond to detection intensity. The analysis unit 52 may create data corresponding to a mass chromatogram in which retention time corresponds to detection intensity, or create data corresponding to a mass spectrum in which m/z values correspond to detection intensity. The analysis method performed by the analysis unit 52 is not particularly limited.

The output control unit 53 creates an output image including information about the measurement conditions of the measurement unit 100 or the results of analysis by the analysis unit 52 such as the mass chromatogram, the mass spectrum, or the like, and outputs the output image to the output unit 44.

According to the above-described embodiment, the following effects can be obtained.

(1) The analytical device 1 according to the present embodiment comprises: the first acceleration unit 310 including the first acceleration electrode 311 to which a pulse voltage for accelerating ions is applied; the flight tube 330; the second acceleration unit 320 that is arranged between the first acceleration unit 310 and the flight tube 330 and includes the second acceleration electrode 321 to which a voltage for accelerating the ions is applied; the detection unit 360; and the capacitance adjustment unit 7 that causes adjustment of a capacitance between at least one set of electrodes among a plurality of electrodes arranged in the first acceleration unit 310, the second acceleration unit 320, and the flight tube 330. Thereby, even if frequency of applying the pulse voltage to the pusher electrode 311 or the puller electrode 312 changes, voltage fluctuation of the electrode connected to the capacitance adjusting unit 7 can be reduced and flight time shifts can be suppressed. Further, the capacity of the capacitor to be arranged can be made smaller than in the case of connecting grounded capacitor and each electrode for suppressing the voltage fluctuation of the electrode. Thus, when changing the voltage of each electrode in order to change polarity of an ion to be detected, the switching time can be shortened.

(2) The analytical device 1 according to the present embodiment includes the liquid chromatograph 10. Accordingly, even in the case where molecules having different m/z are eluted from the liquid chromatograph 10 at the same time, these molecules can be detected efficiently and accurately by increasing the pulse repetition.

(3) In the analytical device 1 according to the present embodiment, the first acceleration electrode 311 includes the pusher electrode 311a and the puller electrode 311b that is arranged at a position closer to the second acceleration unit 320 in comparison with the pusher electrode 311a, and the capacitance adjustment unit 7 may cause adjustment of at least one capacitance among one between the pusher electrode 311a and the second acceleration electrode 321 and one between the pusher electrode 311a and the flight tube electrode 331 arranged in the flight tube 330. Accordingly, the voltage fluctuation of the second acceleration electrode 321 or the flight tube electrode 331 due to the pulse voltage applied to the first acceleration electrode 311 can be suppressed.

(4) In the analytical device 1 according to the present embodiment, the capacitance adjustment unit 7 may generate a capacitance between the pusher electrode 311a and the second acceleration electrode 321 or the flight tube electrode 331 based on stray capacitance between the puller electrode 311b and the second acceleration electrode 321 or the flight tube electrode 331. Accordingly, in the case where pulse voltages having opposite polarities to each other and the same magnitudes are to be respectively applied to the pusher electrode 311a and the puller electrode 311b, the voltage fluctuation of the second acceleration electrode 321 or the flight tube electrode 331 can be remarkably suppressed.

(5) In the analytical device 1 according to the present embodiment, the capacitance adjustment unit 7 causes adjustment of a capacitance between the pusher electrode 311a and the puller electrode side acceleration electrode P that is arranged at the closest position in the second acceleration unit 320 from the first acceleration unit 310. Accordingly, among the electrodes included in the second acceleration unit 320, the voltage fluctuation of the puller electrode side acceleration electrode P, that is affected most severely by the pulse voltage, can be suppressed, and the flight time shift can be efficiently reduced.

(6) In the analytical device 1 according to the present embodiment, the capacitance adjustment unit 7 causes adjustment of a capacitance between the second acceleration electrode 321 and another second acceleration electrode 321 or the flight tube electrode 331. Accordingly, it is possible to reduce the voltage fluctuation of the second acceleration electrode 321 due to the pulse voltage and suppress the flight time shift.

The following variations are also within the scope of the present invention and can be combined with the above embodiment. In the following Variations, the parts showing the same structure and function as those in the above-described embodiment will be referred to by the same reference signs, and the description thereof will be omitted as appropriate.

Variation 1

In the above-described embodiment, the capacitance adjustment unit 7 causes adjustment of the capacitance between each electrode in the TOF-MS by using a capacitor, however, as long as the capacitance can be generated between the two connecting points, a metal plate or the like may be used, and the mode is not particularly limited.

Variation 2

Although the analytical device 1 of the above-described embodiment is a liquid chromatograph-tandem mass spectrometer, it may not be provided with a liquid chromatograph and may be provided with a separation analysis device other than the liquid chromatograph. The mass spectrometer 20 may be a TOF-MS that is not a tandem mass spectrometer.

Variation 3

In addition to the first capacitor 71, the second capacitor 72, the third capacitors 81a, 81b and 81c, and the fourth capacitor 82 shown in the above-described embodiment, the capacitance adjustment unit 7 can be arranged between any electrodes arranged on the first acceleration unit 310, the second acceleration unit 320 and the flight tube 330. Accordingly, the capacitance between the electrodes can be adjusted, and when the polarities of the ions to be detected are switched, the voltage applied to these electrodes can be inverted in a short time.

The present invention is not limited to the contents of the above embodiments. Other aspects conceivable within the scope of the technical idea of the present invention are also included within the scope of the present invention.

EXAMPLES

In the following Examples, TOF-MS was used to detect a standard sample having a known m/z while pulse period is changed, and the time-of-flight shift due to the change in the pulse period was measured.

Comparative Example

A standard sample was subjected to mass spectrometry using TOF-MS in which a capacitance adjusting unit 7 is not arranged, that is, a capacitor or the like was not arranged between a pusher electrode and a second acceleration electrode or a flight tube electrode. Mass spectrometry was performed in the cases: (a) in which the pulse width was fixed at 10 μs and the pulse period was changed from 500 μs to 125 μs; and (b) in which the pulse period was fixed at 125 μs and the pulse width was changed from 3 μs to 10 μs. The cases (a) and (b) regarding the pulse period and the pulse width are the same in Examples 1 to 3 described later.

Figure 6A:
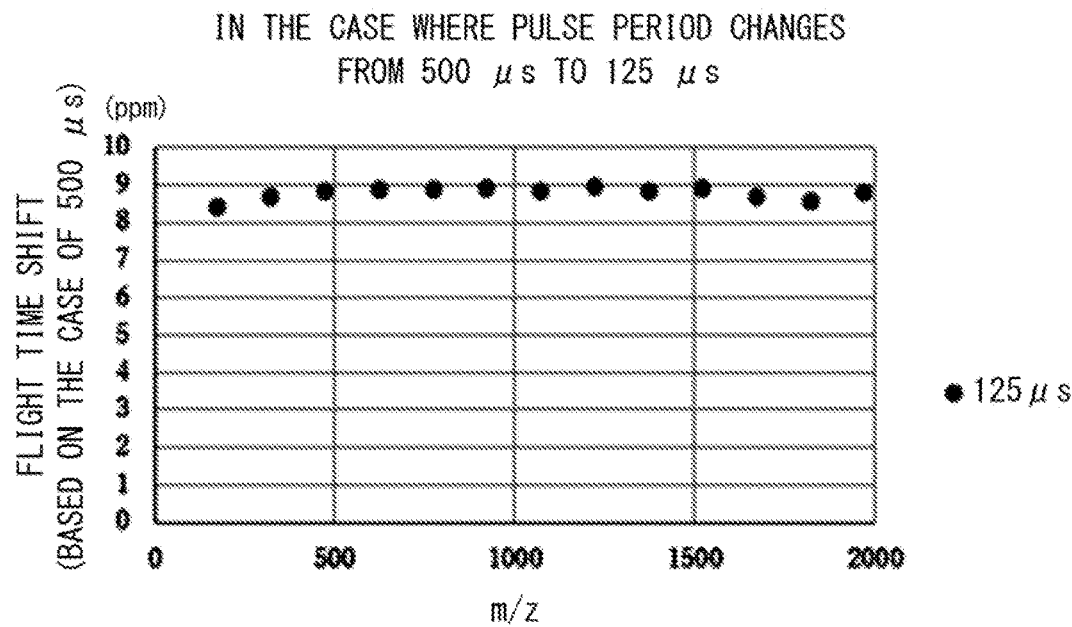
FIG. 6(A) is a graph showing a flight time shift when pulse period is changed in a comparative example.

FIG. 6(A) is a graph showing a flight time shift caused by change in the pulse period in the above-mentioned case (a). The horizontal axis shows m/z of the components of the standard sample, and the vertical axis shows a flight time shift when the pulse period is 125 μs with respect to the flight time when the pulse period is 500 μs (the same is applied to later described FIG. 7 (A), FIG. 8 (A) and FIG. 9 (A)). A flight time shift of approximately 8 to 9 ppm was detected.

Figure 6B:
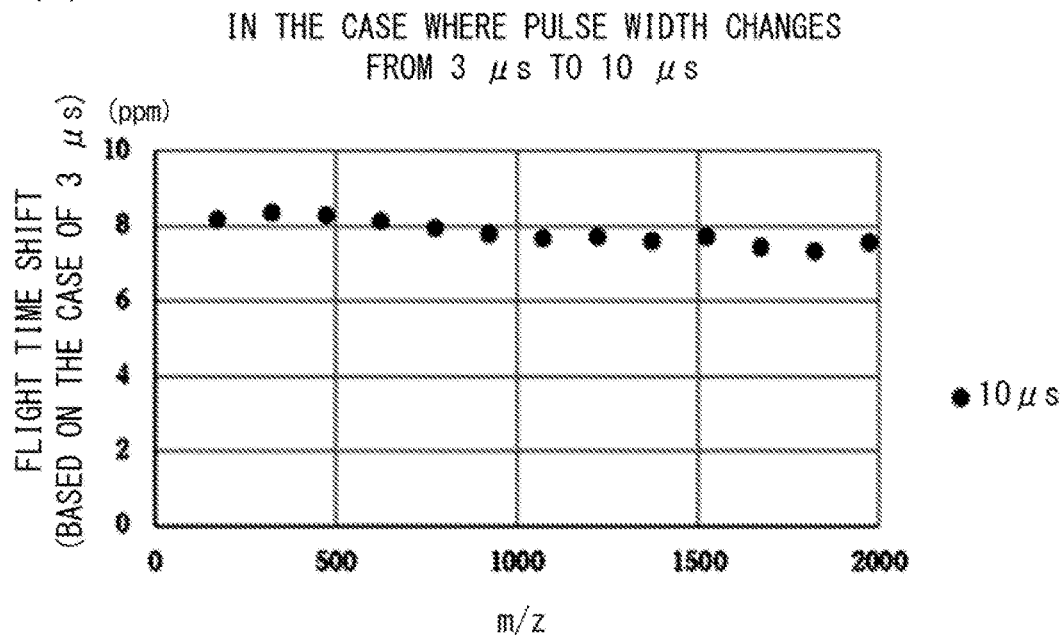
FIG. 6(B) is a graph showing a flight time shift when pulse width is changed in the comparative example.

FIG. 6(B) is a graph showing a flight time shift caused by change in the pulse width in the above-mentioned case (b). The horizontal axis shows m/z of the components of the standard sample, and the vertical axis shows a flight time shift when the pulse width is 10 μs with respect to the flight time when the pulse period is 3 μs (the same is applied to later described FIG. 7 (B), FIG. 8 (B) and FIG. 9 (B)). A flight time shift of approximately 7 to 9 ppm was detected.

Example 1

A standard sample was subjected to mass spectrometry using TOF-MS as follows: a capacitor having a capacitance of 25 pF was arranged between the pusher electrode and the puller electrode side acceleration electrode; a capacitor having a capacitance of 0.5 pF was arranged between the pusher electrode and the flight tube electrode; and no capacitors are arranged between each of the second acceleration electrodes and the flight tube electrode.

Figure 7A:
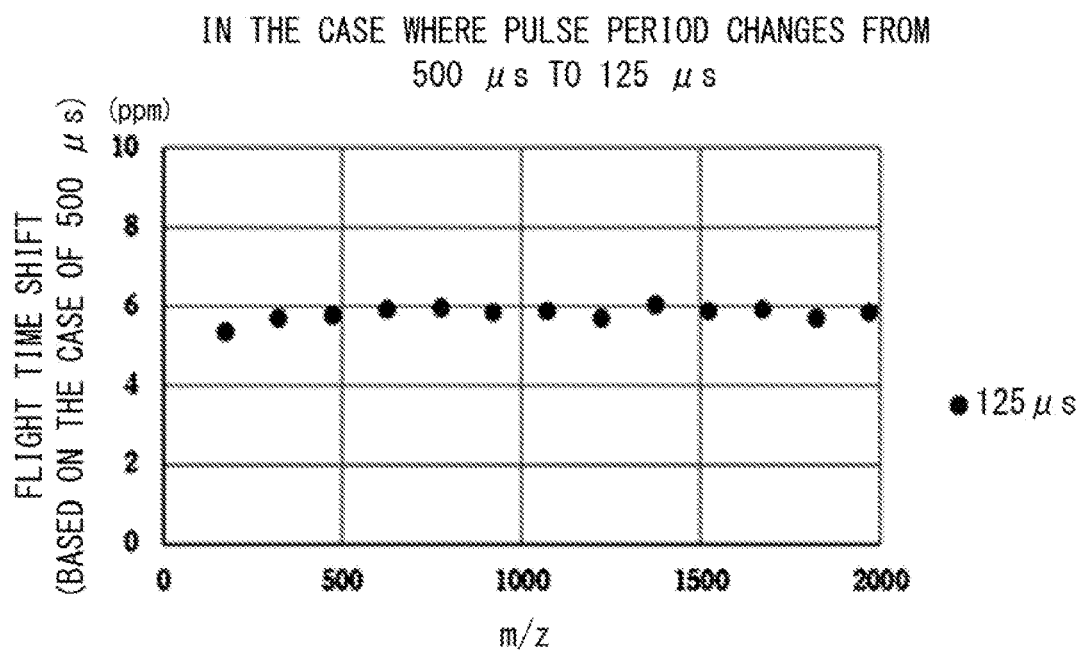
FIG. 7(A) is a graph showing a flight time shift when the pulse period is changed in a first example.

FIG. 7(A) is a graph showing a flight time shift caused by change in the pulse period in the above-mentioned case (a). A flight time shift of approximately 5 to 6 ppm was detected, and the flight time shift was reduced as compared with the comparative example (8 to 9 ppm).

Figure 7B:
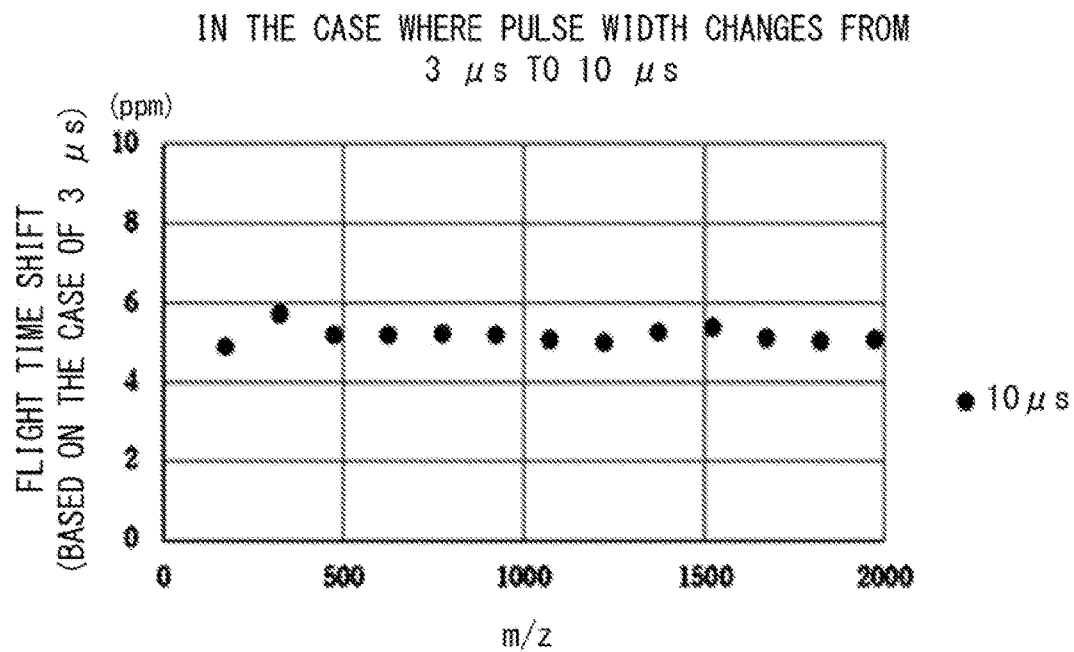
FIG. 7(B) is a graph showing a flight time shift when the pulse width is changed in the first example.

FIG. 7(B) is a graph showing a flight time shift caused by change in the pulse width in the above-mentioned case (b). A flight time shift of approximately 5 to 6 ppm was detected, and the flight time shift was reduced as compared with the comparative example (7 to 9 ppm).

Example 2

A standard sample was subjected to mass spectrometry using TOF-MS as follows: capacitors having capacitance of 1000 pF are arranged between the neighboring second acceleration electrodes and between the electrode closest to a flight tube among the second acceleration electrodes and the flight tube electrode, respectively; and no capacitors are arranged between the pusher electrode and the second acceleration electrodes or the flight tube electrode.

Figure 8A:
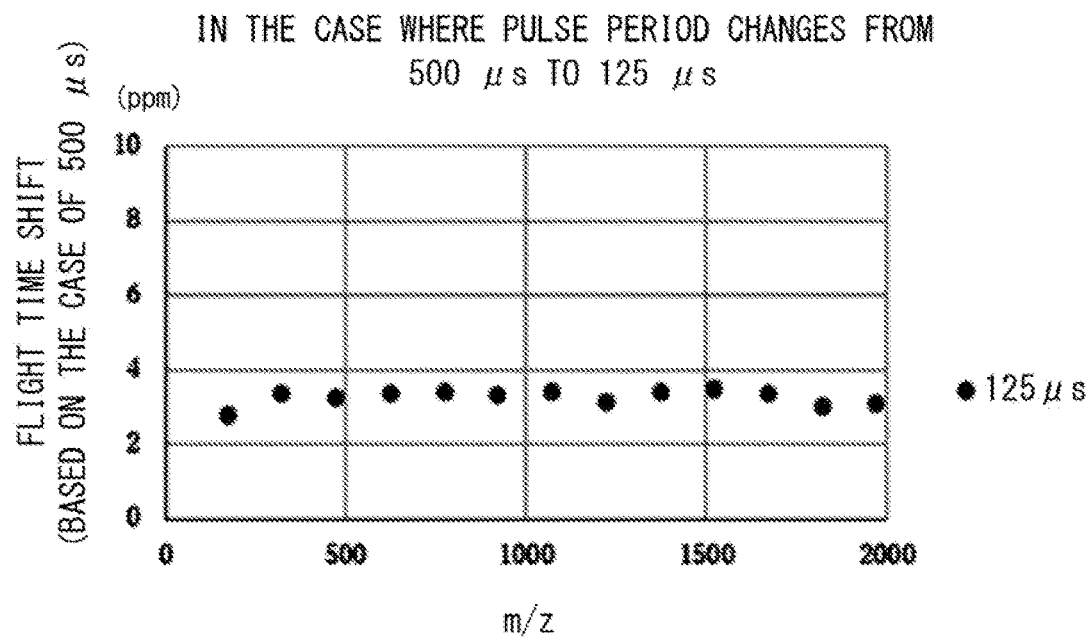
FIG. 8(A) is a graph showing a flight time shift when the pulse period is changed in a second example.

FIG. 8(A) is a graph showing a flight time shift caused by change in the pulse period in the above-mentioned case (a). A flight time shift of approximately 3 to 5 ppm was detected, and the flight time shift was reduced as compared with the comparative example (8 to 9 ppm).

Figure 8B:
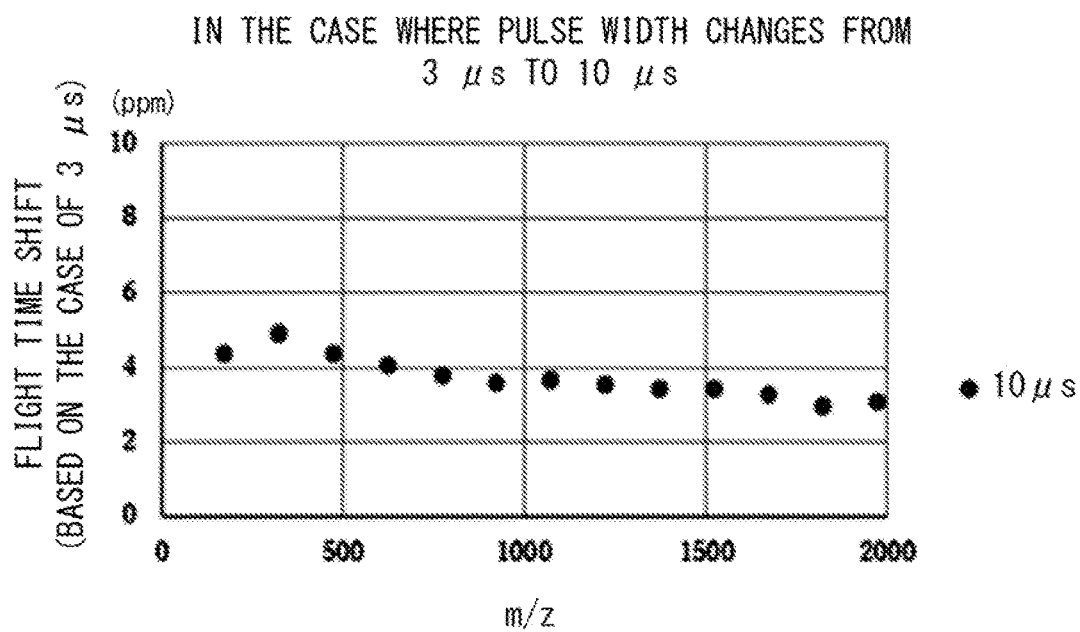
FIG. 8(B) is a graph showing a flight time shift when the pulse width is changed in the second example.

FIG. 8(B) is a graph showing a flight time shift caused by change in the pulse width in the above-mentioned case (b). A flight time shift of approximately 3 to 5 ppm was detected, and the flight time shift was reduced as compared with the comparative example (7 to 9 ppm).

Example 3

A standard sample was subjected to mass spectrometry using TOF-MS as follows: a capacitor having a capacitance of 25 pF is arranged between the pusher electrode and the puller electrode side acceleration electrode; a capacitor having a capacitance of 0.5 pF is arranged between the pusher electrode and the flight tube electrode; and capacitors each having a capacitance of 1000 pF are arranged between the neighboring second acceleration electrodes and between the electrode closest to the flight tube among the second acceleration electrodes and the flight tube electrode, respectively.

Figure 9A:
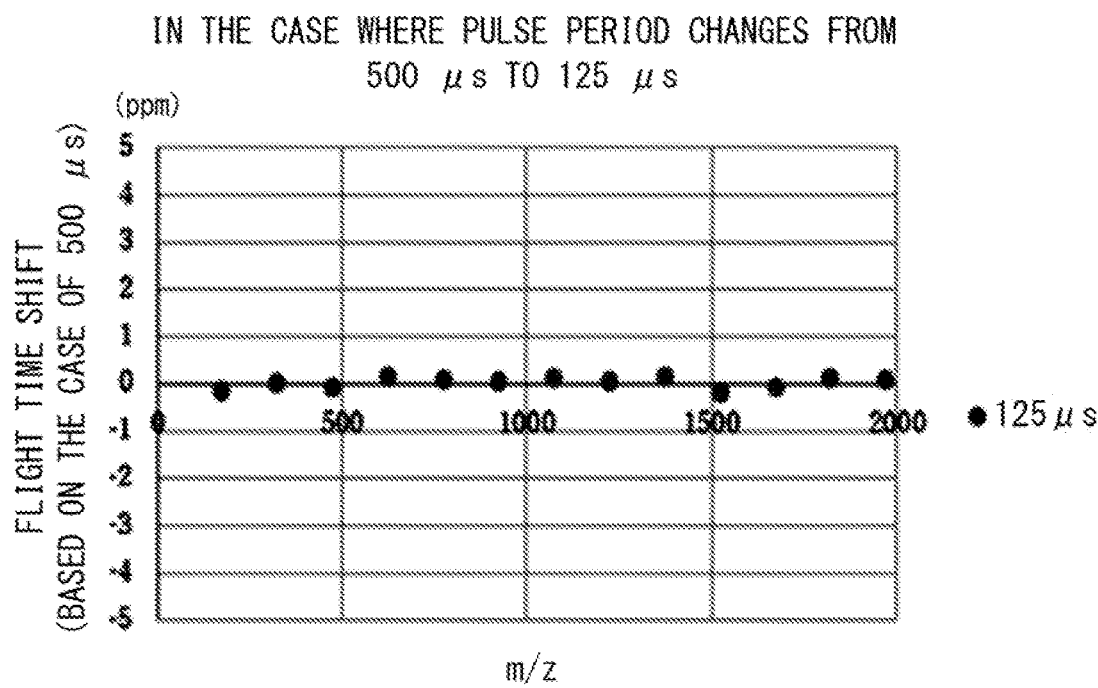
FIG. 9(A) is a graph showing a flight time shift when the pulse period is changed in a third example.

FIG. 9(A) is a graph showing a flight time shift caused by change in the pulse period in the above-mentioned case (a). A flight time shift was reduced to 1 ppm or less.

Figure 9B:
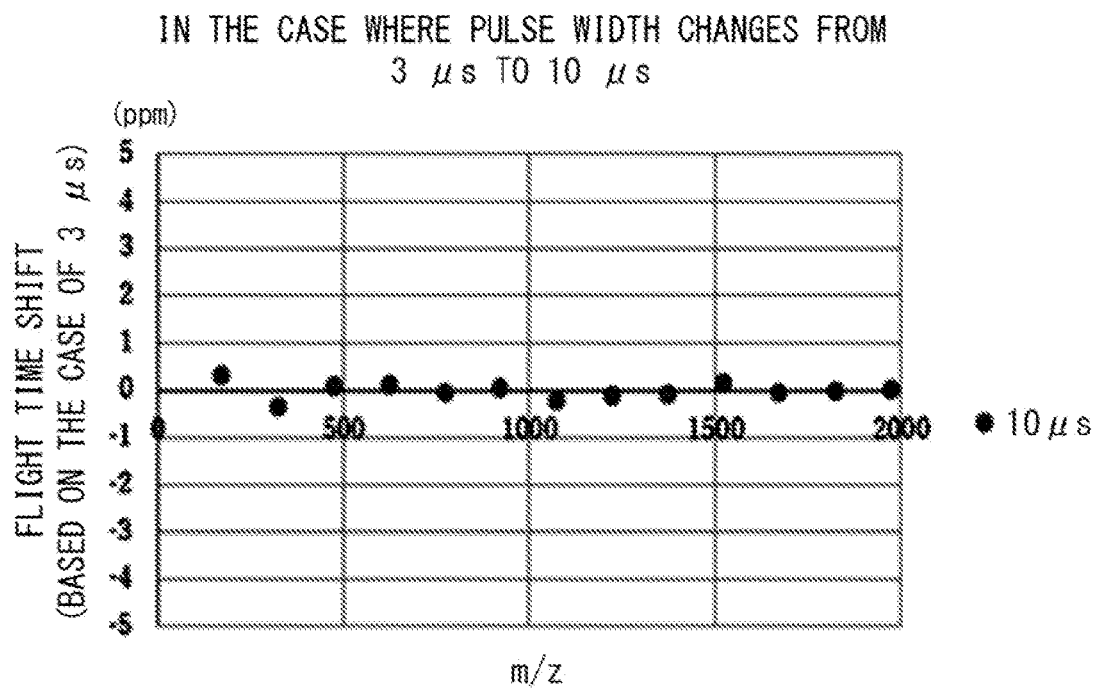
FIG. 9(B) is a graph showing a flight time shift when the pulse width is changed in the third example.

FIG. 9(B) is a graph showing a flight time shift caused by change in the pulse width in the above-mentioned case (b). A flight time shift was reduced to 1 ppm or less.

REFERENCE SIGNS LIST

1 . . . Analytical Device, 7 . . . Capacitance Adjustment Unit, 10 . . . Liquid Chromatograph, 14 . . . Analytical column, 20 . . . Mass Spectrometer, 21 . . . Ionization Chamber, 23 . . . First Mass Separation Unit, 24 . . . Collision Cell, 30 . . . Analysis Chamber, 40 . . . Information Processing Unit, 50 . . . Control Unit, 71 . . . First Capacitor, 72 . . . Second Capacitor, 81a, 81b, 81c . . . Third Capacitor, 82 . . . Fourth Capacitor, 91 . . . Second Acceleration Electrode Power Supply, 93 . . . Flight Tube Power Supply, 100 . . . Measurement Unit, 310 . . . First Acceleration Unit, 311 . . . First Acceleration Electrode, 311a . . . Pusher electrode, 311b . . . Puller electrode, 320 . . . Second Acceleration Unit, 321, 321a, 321b, 321c, 321d . . . Second Acceleration Electrode, 340 . . . Reflectron Electrode, 360 . . . Detection Unit, P . . . Puller electrode Side Acceleration Electrode, S . . . Sample.

The invention claimed is:

1. An analytical device, comprising:
a first acceleration unit including a first acceleration electrode to which a pulse voltage for accelerating ions is applied;
a flight tube;
a second acceleration unit that is arranged between the first acceleration unit and the flight tube, and includes a second acceleration electrode to which a voltage for accelerating the ions is applied;
an ion detector that detects the ions; and
a capacitance adjustment unit that causes adjustment of a capacitance between at least one set of electrodes among a plurality of electrodes arranged in the first acceleration unit, the second acceleration unit, and the flight tube, wherein
the first acceleration electrode includes a first electrode and a second electrode that is arranged at a position closer to the second acceleration unit in comparison with the first electrode,
the first electrode and the second electrode are arranged to allow the ions to enter between the first electrode and the second electrode,
a pulse voltage having a same polarity as a polarity of the ions is applied to the first electrode during acceleration of the ions such that the ions that enter between the first electrode and the second electrode are accelerated in a direction away from the first electrode, and
the capacitance adjustment unit includes a capacitor directly connected between the first electrode and a flight tube electrode arranged in the flight tube.

2. The analytical device according to claim 1, wherein:
the capacitance adjustment unit generates a capacitance between the first electrode and the second acceleration electrode and the flight tube electrode based on stray capacitance between the second electrode and the second acceleration electrode or the flight tube electrode.

3. The analytical device according to claim 1, wherein:
the capacitance adjustment unit causes adjustment of a capacitance between the first electrode and the second acceleration electrode that is arranged in the second acceleration unit at the closest position from the first acceleration unit.

4. The analytical device according to claim 1, wherein:
the capacitance adjustment unit causes adjustment of a capacitance between the second acceleration electrode and another second acceleration electrode or an electrode arranged in the flight tube.

5. The analytical device according to claim 2, wherein:
the capacitance adjustment unit causes adjustment of a capacitance between the first electrode and the second acceleration electrode that is arranged in the second acceleration unit at the closest position from the first acceleration unit.

6. The analytical device according to claim 1, wherein:
the capacitance adjustment unit causes adjustment of a capacitance between the second acceleration electrode and another second acceleration electrode or an electrode arranged in the flight tube.

7. The analytical device according to claim 2, wherein:
the capacitance adjustment unit causes adjustment of a capacitance between the second acceleration electrode and another second acceleration electrode or an electrode arranged in the flight tube.

8. The analytical device according to claim 3, wherein:
the capacitance adjustment unit causes adjustment of a capacitance between the second acceleration electrode and another second acceleration electrode or an electrode arranged in the flight tube.

9. The analytical device according to claim 5, wherein:
the capacitance adjustment unit causes adjustment of a capacitance between the second acceleration electrode and another second acceleration electrode or an electrode arranged in the flight tube.

* * * * *